C. F. STRNAD.
FOLDABLE EXTENSION FEEDER FOR THRESHING MACHINES.
APPLICATION FILED MAY 14, 1917.
1,280,099.
Patented Sept. 24, 1918.
2 SHEETS—SHEET 1.
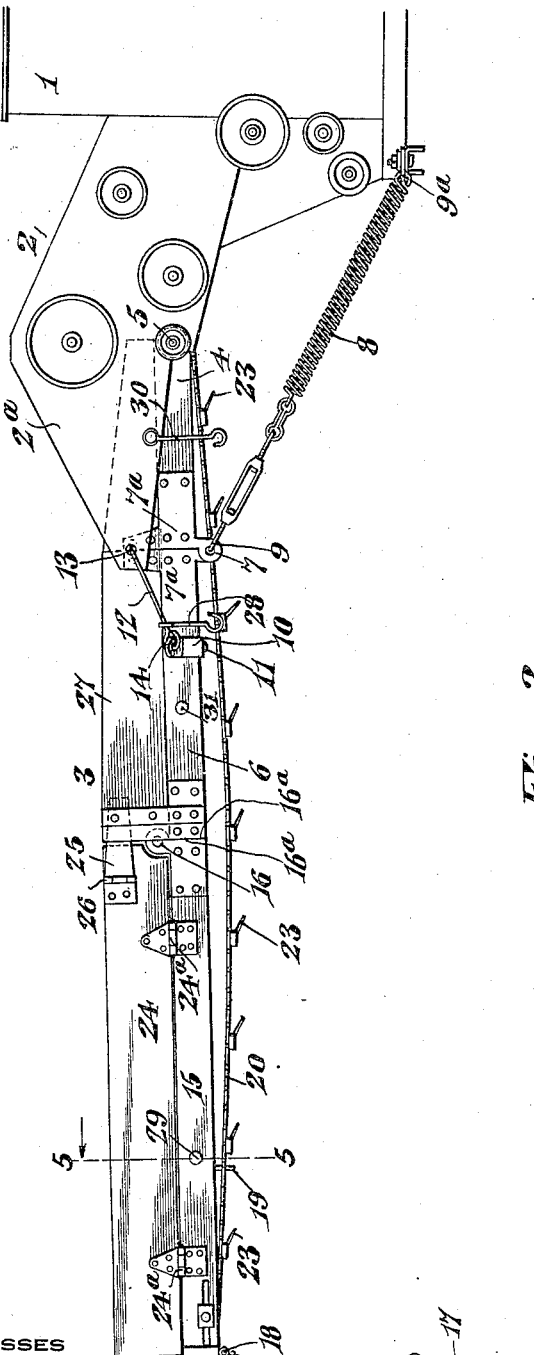
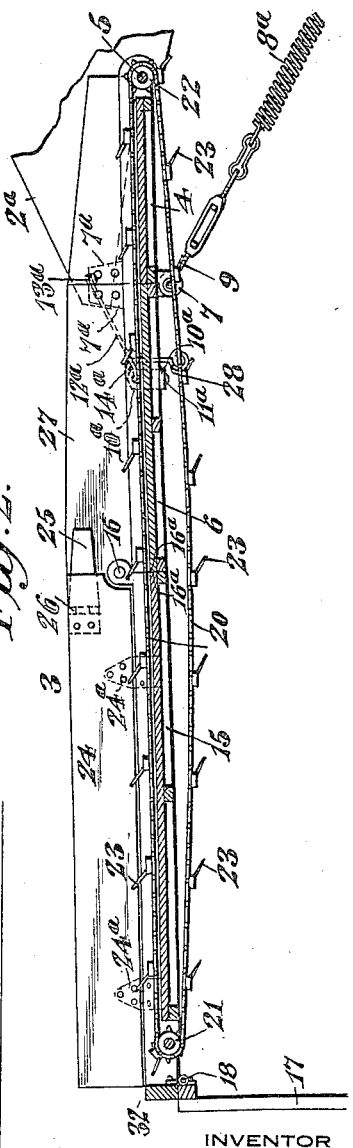
WITNESSES
INVENTOR
Charlie F. Strnad
BY
ATTORNEY C. F. STRNAD.
FOLDABLE EXTENSION FEEDER FOR THRESHING MACHINES.
APPLICATION FILED MAY 14, 1917.
1,280,099.
Patented Sept. 24, 1918.
2 SHEETS—SHEET 2.
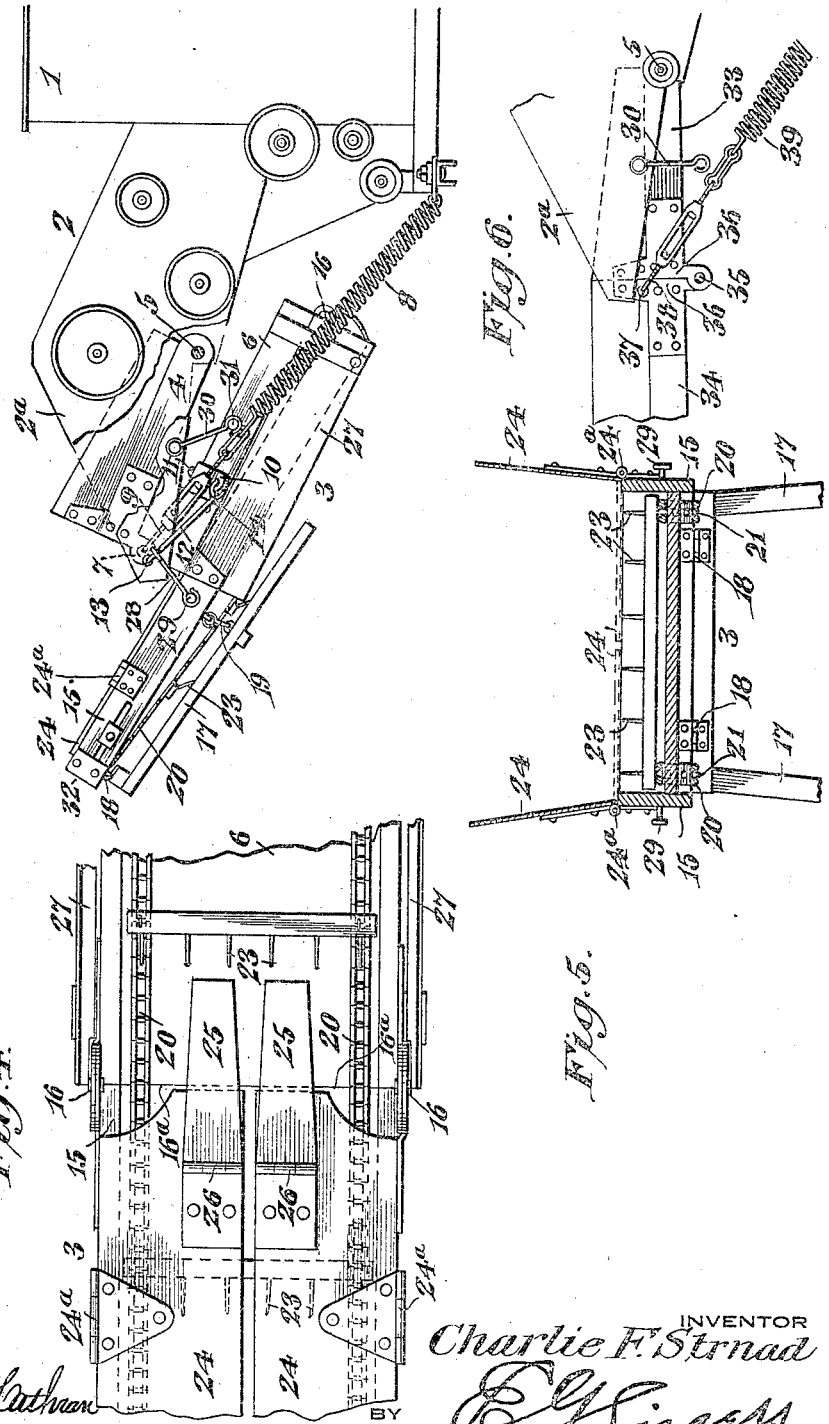

UNITED STATES PATENT OFFICE.

CHARLIE F. STRNAD, OF NARKA, KANSAS.

FOLDABLE EXTENSION-FEEDER FOR THRESHING-MACHINES.

1,280,099.

Specification of Letters Patent. Patented Sept. 24, 1918.

Application filed May 14, 1917. Serial No. 168,459.

*To all whom it may concern:*

Be it known that I, CHARLIE F. STRNAD, a citizen of the United States, residing at Narka, in the county of Republic and State of Kansas, have invented a new and useful Foldable Extension-Feeder for Threshing-Machines, of which the following is a specification.

This invention relates to foldable extension feeders for threshing machines, and is adaptable for use in either stack or shock threshing and in threshing either headed or bundle grain.

One object of the invention is to provide a feeding attachment for threshing machines which can be easily handled, may be readily set up into position for work, quickly folded, and will afford no obstacle, and give no trouble, when moving the machine on the road.

Another object of the invention is to provide a simple construction without any extra sprockets or drive chains, which is low down so as to allow for easy pitching, and in case of fire the feeder may move along with the thresher without folding or removing.

The invention consists of the novel construction, combination and arrangement of parts hereinafter specified and particularly pointed out in the claims hereto appended.

In the accompanying drawings, I have illustrated one embodiment of my invention, in which:

Figure 1 is a side view of the feeder extended, showing it applied to a threshing machine.

Fig. 2 is a longitudinal sectional view.

Fig. 3 is a side view, showing the feeder folded for transportation.

Fig. 4 is a detail plan view of a portion of the feeder.

Fig. 5 is a transverse sectional view on the line 5—5 of Fig. 1, looking in the direction of the arrow.

Fig. 6 is a detail side view of a modified form.

In the embodiment of the invention herein illustrated, only so much of the thresher frame is shown, being indicated at 1, as is necessary to illustrate the application of the invention. A casing 2 is provided at the feeding end of the thresher and comprises spaced vertical side walls $2^a$, and is for the purpose of initially receiving the grain to be threshed and feeding it to the threshing mechanism, and should contain among other things a band and feeder cutter of approved pattern.

An extension grain carrier or feeder 3 is attached to the casing 2 with the inner end thereof interposed between the sides $2^a$ thereof and discharging directly thereto. The feeder comprises an inner section 4, an intermediate section 6, and an outer section 15. The inner section is pivoted at its inner end upon a shaft 5 extending transversely of the casing 2 and mounted upon the walls $2^a$ thereof, and comprises the usual bottom and side walls. The intermediate section 6 is pivoted at its inner end 7 to the outer end of the section 4. The pivotal connection of the sections 4 and 6 to each other is below the sections so that the adjacent ends $7^a$ of the sections 4 and 6 provide stops above the pivot 7, whereby the sections can only be folded by bringing their bottoms toward each other, as clearly shown in Fig. 3. It will also be noted that the pivot between the inner and outer sections is arranged below the casing and inwardly from the outer end of the latter, said inner section 4 being shorter than the distance between the shaft 5 and the outer end of said casing.

Springs 8 and $8^a$ are utilized for assisting the movement of the sections 4 and 6 into alinement or extended position when the feeder is being unfolded. As shown in Figs. 1 and 2, one of the springs is located at each side and is inclined, being attached at its upper end 9 to the pivot 7, or to both sections 4 and 6 at the pivot, and at its lower end $9^a$ to a suitable fixed part of the frame 1. The springs normally exert a tension tending to move the pivot 7 downwardly which moves the sections into alinement, as will be more fully explained.

Outwardly extending arms or brackets 10 and $10^a$ are attached at 11 and $11^a$ to the bottom of the section 6 intermediate its ends and project beyond its sides. Links 12, $12^a$ are loosely connected at their upper ends 13, $13^a$, to the forward ends of the side walls $2^a$, and at their lower ends 14, $14^a$ to the outer ends of the arms 10 and $10^a$. The points of connection of the links 12, $12^a$ to the side walls $2^a$ lie above the pivot 7 in vertical alinement therewith when the feeder is extended (see Fig. 1), but will lie nearly in transverse alinement with the pivot 7 when the section 4 swings upwardly around its axis 5 to the position shown in Fig. 3. During the folding and unfolding operations of the sections, the said links remain connected to the sections. The links 12, 12ª limit the downward movement of the sections 4 and 6 and support them at the right inclination when extended for use.

When the outer end of the section 6 is pushed downwardly to fold it against the bottom of the section 4, section 6 will rotate around the lower ends of the links 12, 12ª as an axis raising the pivot 7 into transverse alinement, or substantially so, with the upper ends 13, 13ª of the links. The upper axis of the links then being coincident or substantially so with the axis or pivot 7, the links will swing backwardly to the position shown in Fig. 3, and the sections can be folded without trouble. It should be noticed that the swinging of the sections 4 and 6 raises their general elevation and changes their inclination so that they will be elevated out of the way, the raising of the sections being due to the particular link connection. When the sections 4 and 6 are folded they assume the position shown in Fig. 3, and the springs 8, 8ª will be tensioned so that they will assist in the unfolding operation.

The outer section 15 is pivoted to the outer end of the section 6 above the bottom thereof, as indicated at 16. The adjacent ends 16ª of the sections 6 and 15 below the pivot constitutes stops to prevent the outer section from moving downwardly out of alinement with the intermediate section. The outer section is, therefore, foldable upwardly over the top of the intermediate section.

To the outer end of the section 15 a supporting frame or leg 17 is pivoted at its upper end 18, and is adapted to be folded back against the bottom of the section 15. The supporting frame 17 can be retained in position against the bottom of the section 15 by means of a hook or hooks 19.

It is to be understood, of course, that the feeder or carrier 3 is provided with suitable chains 20 driven by and extending over the sprockets 21 and 22, the sprockets 22 being mounted upon the shaft 5 to which power is applied. The chains are provided with the usual forks or engaging prongs 23 for moving the grain toward the feeding end 2 of the thresher. The chains are so arranged, however, as not to interfere with the folding of the several sections of the feeder.

In order to allow the top of the section 15 to be folded toward the top of the section 6, the side boards or walls 24 thereof are hinged at their lower edges 24ª, whereby they may be folded down into a horizontal position, as shown in dotted lines in Fig. 5 or raised to a vertical position, as shown. It will be noted that the point of hinging of the side boards or walls is slightly above the horizontal plane of the tops of the engaging prongs 23 of the conveyer chains, so that when the side boards or walls are swung down they extend over the said tops and make contact with the prongs. The height of the said side boards or walls is such that when both boards are swung inwardly over the section they bridge, span or cover practically the entire width of the section. In order to retain these side walls in vertical position when the feeder is extended and in use, the inner ends thereof are provided with flaps or tongues 25 which are hinged at their inner ends, as shown at 26, to the outer sides of the walls 24 inwardly of the inner ends of the walls 24, and which project beyond the inner ends of the side walls 24 and are adapted to engage the walls 27 of the intermediate section 6, whereby the said walls 27 will retain the foldable walls 24 in vertical position. When the walls 24 are folded downwardly the tongues 25 are folded back out of the way upon the walls 24. In their folded position, the walls 24 act as a retainer for the endless sprocket chain while folding the feeder sections and also during the period the sections are in folded position.

The links 12 and 12ª are provided with hooks 28 adapted to be connected to or engage pins 29 upon the outer section 15, while other hooks 30 are connected to the side walls 2ª and are adapted to be connected to engage pins 31 upon the intermediate section 6 to retain them in folded position, as shown in Fig. 3.

As shown in Fig. 3, it will be seen that the parts when folded are very compact and are entirely out of the way and are mainly disposed beneath the feeding end of the thresher. When it is desired to extend the feeder for use, the hooks 30 are detached from their pins 31, the hooks 28 are then released from their pins 29 and the outer end 32 of the feeder is grasped and pulled outwardly. The intermediate section 6 will then move around its pivotal connection 7 with the inner section 4, while the outer section 15 will move around its pivotal connection 16 with the intermediate section so that the several sections tend to move into alinement with each other. The springs 8, 8ª, while the feeder is being pulled out and supported at its outer end 32 by a person, materially reduce the effort necessary and cause the sections 4 and 6 to quickly move into alinement with each other and also lowers them to the position shown in Fig. 1. The links 12, 12ª support the section 6 and indirectly the outer end of section 4 while the springs are acting and prevent them from dropping down or from being pulled down too far. The supporting frame 17 is then released and allowed to support the outer end of the feeder. In folding the device the reverse operation takes place. The supporting frame 17 is moved upwardly against the bottom of the section 15 and locked. The side walls are then folded downwardly to a horizontal position, the tongues are folded back upon the side walls 24 and the section 15 then folded upwardly upon the top of the intermediate section 6. The intermediate section 6 with the section 15 thereon is then folded downwardly around the links 12 and 12ª as above described, so that the bottoms of the sections 4 and 6 face each other, as shown in Fig. 3. The several parts are then hooked in position. It will be observed upon reference to Fig. 3, that the outer section 15 is considerably longer than the intermediate section, and, when folded, the main portion of the outer section fits within and upon the intermediate section between the side walls thereof. The sections assume an inclined position with a portion of the outer section projecting beyond the intermediate section and also beyond the outer end of the casing 2 of the threshing machine, and above the plane of the bottom of said casing. In this position, the sections are supported in part by the links 12, 28 and 30, and by the springs 8, the chains 20 passing around the sprocket wheel on the shaft 5. As a result, the weight of the sections is distributed on opposite sides of the pivotal connection between the intermediate and inner sections, and the parts assume a more compact relation than has heretofore been deemed possible considering the length of the sections of the feeder when extended.

In cases where the inner section is immovably fixed to the separator casing, the springs will be attached directly to the intermediate section. I have illustrated this in Fig. 6, where the inner section 33 is fixed and the intermediate section 34 is pivoted thereto at 35, the pivot 35 being at the lower portion of the adjacent ends of the sections providing stops 36, as in the construction shown in Fig. 1. The end of the section 33 adjacent the inner section is provided at each side with openings 37 to which the upper ends 38 of the springs 39 are attached, the points of attachment being located, when the feeder is extended, above the pivot 35. The springs 39 are arranged substantially like those in Fig. 1 in other respects and at the same inclination, being attached at their lower ends to the framework. In the form shown in Fig. 6, it will be seen that the springs exert a tension upon the intermediate section 34 at a point above its pivot so that they tend normally, when the feeder is extended, to retain it in alinement with and abutting against the inner section 33. It should be noticed, however, that when the intermediate section 34 is folded toward the bottom of the fixed section 33 that the springs will exert a tension which tends to keep the sections in folded position, the connection of the springs to the intermediate section 34 then being below the pivotal connection 35.

By the above description, it will be seen that my invention possesses several advantages. Among these advantages, attention is especially called to the compactness of the atachment and to the fact that the thresher is not encumbered with a tremendous weight, so that the machine cannot be easily upset. The feeder is also very easily handled and readily set up into position for work, and entirely out of the way when moving upon the road.

Another advantage resides in the fact that no gearing is needed and no extra sprockets or drive chains, as the chain used is a continuation of the main feeder of the threshing machine. The construction is very light, strong and durable. It is also low down, whereby the grain may be pitched easily into the same. In case of fire or accident, the feeder can be moved with the separator, without folding or removing it, and it is never in the way.

While I have shown and described one embodiment of my invention, it is to be understood that I do not desire to be limited to the details of construction herein shown and described for obvious modifications will be apparent to anyone skilled in the art.

In order to drive the shaft 5, suitable means such as a sprocket chain or the like may be utilized to propel the shaft from the band cutters or other available parts of the threshing machine.

While the springs 39 have been described with reference to the form shown in Fig. 6, as tending to hold the feeder in both the extended and the folded positions, it is to be understood that the springs 8 and 8ª serve the same purpose in the structure of Fig. 1 and associated figures.

What is claimed is:—

1. A foldable feeder comprising a plurality of sections hinged to each other and to a thresher frame so as to be arranged in either a substantially horizontal position with the sections in alinement, or with the sections one upon the other in a folded position, resilient means connected with the frame of the thresher at a point below the axis of movement of the sections and also having connection with the sections to move them into alinement when extended and also to hold said sections in folded relation to each other, and means active for elevating the innermost section on the folding of the sections together.

2. A foldable feeder comprising a plurality of sections hinged to each other and to a threshing frame so as to be arranged in either a substantially horizontal position with the sections in alinement, or with the sections one upon the other in a folded position, resilient means connected with the frame of the thresher at a point below the axis of movement of the sections, and also having connection with the sections to move them into alinement when extended, and also to hold said sections in folded relation to each other.

3. The combination with a threshing machine having a feeder casing, of a foldable feeder comprising a plurality of sections pivoted together, the inner section being arranged within the walls of said casing, and resilient means connected to the frame below the axis of movement of said sections and also connected to the sections to move them into alinement when extended and also to hold said sections in folded relation.

4. The combination with a frame, of a plurality of sections hinged to each other and to the frame so as to be arranged in either an extended position with the sections in alinement, or with the sections folded one upon the other, resilient means connected with the frame at a point below the axis of movement of the sections, and also having connection with the sections so as to exert a downward pull upon the same during the folding and unfolding operations, and links pivoted at their upper ends to a single section other than the innermost section, said links retaining their connection with said frame and said section throughout the folding and unfolding operation of the sections, whereby the sections are maintained at a proper inclination when extended, and the innermost section is caused to move upwardly upon the folding of the sections.

5. The combination with a threshing machine, of a foldable feeder having multiple sections foldable relative to each other, and springs hinged to a part of the threshing machine below the path of movement of said sections and connected to said sections for automatically bringing the sections in either substantially horizontal extended or folded positions after initially manually moving the same.

6. The combination with a frame, and an inner section hinged at its inner end to the frame, a section hinged to the outer end of the inner section and foldable downwardly relatively thereto, springs connecting the sections at their pivots to the framework and tending to move the same downwardly into alinement with each other, and links pivoted at their upper ends to the frame above the pivotal connection between the sections and at their lower ends to the intermediate portion of the last-mentioned section.

7. In combination with a threshing machine having a feeder casing, and a shaft arranged transversely of the casing at a point remote from the outer end of the latter, a foldable feeder composed of a plurality of sections pivoted together, the inner section being arranged within the wall of said casing and pivotally mounted on said shaft, a sprocket wheel mounted on said shaft, another sprocket wheel mounted on the outer one of said sections, a sprocket chain carrying feeding elements and connecting the several sections and passed around the said sprocket wheels and driven from the sprocket wheel on said shaft, the sections of the feeder other than the inner section being foldable one upon the other beneath the inner section and also beneath the feeder casing, links pivotally connected to the outer end of the feeder casing at a point which is in vertical alinement with the hinges connecting the innermost two of the sections together, when said sections are in unfolded relation, said device being also loosely connected with the section next adjacent to the feeder casing at a point between the ends of said sections, said links remaining in connected relation with said parts throughout the folding and unfolding operations of the sections, and springs connected at one of their ends to one of the sections contiguous to the hinge connection between the inner and intermediate sections and at their other ends to the frame below the axis of movement of the feeder sections.

8. The combination with the feed end of a threshing machine having a casing, of a foldable feeder comprising a plurality of hingedly connected sections, the hinge connection between the inner and intermediate section being below the same so as to bring the bottoms thereof toward each other when folded, and said hinge connection being located adjacent to the outer end of said casing, and links loosely connected to the outer end of the casing at a point which is in vertical alinement with the hinge connection between the inner and intermediate sections when said feeder is in its unfolded position, said links being loosely connected at their outer ends to the intermediate section at a point between the ends of said intermediate section, said links remaining in connected relation with said casing and said intermediate section throughout the folding and unfolding operation of the sections, whereby the weight of that part of the intermediate section lying between the hinge connection of the inner and intermediate sections and the point of connection of the outer ends of the links to the intermediate section, assists the weight of the inner section to provide a perfect balance.

9. A foldable feeder comprising a frame, inner, outer and intermediate sections pivoted to each other, said inner section being also pivoted at its inner end to the frame, inclined springs connected at their upper ends to the inner and intermediate sections adjacent their pivot and at their lower ends to the frame of the thresher, whereby said springs tend to move said sections downwardly into alinement, links connecting the frame of the thresher with said intermediate section to limit the downward movement of said section, said links being loosely connected to the frame and said intermediate section to allow the same to be folded, the pivot of the inner and intermediate sections being located below the horizontal plane of their ends, so that the intermediate section, must be folded downwardly against the bottom of the inner section and the pivot of the intermediate and outer sections being located above the horizontal plane of their ends, whereby the outer section may be folded on top of the intermediate section.

10. In combination with a threshing machine having a casing projecting therefrom at its feeding end, a foldable feeder comprising an inner section, an intermediate section and an outer section, the inner and intermediate sections being hinged together at their respective bottoms and the outer and intermediate sections being hinged together above the plane of their respective bottoms, said sections when folded having the outer section folded upon the intermediate section and the latter with the outer section folded beneath the inner section and also below the said casing, and links pivotally connected to the casing at one end and to the intermediate section beyond the hinge connection thereof at the other end, the pivotal connection of the links with the casing being at a point in substantially vertical alinement with the hinge connection between the inner and intermediate sections when said sections are in unfolded relation, said links remaining in their connected relation with the casing and section throughout the folding and unfolding of the sections.

11. In combination with a threshing machine having a casing projecting therefrom at its feeding end, a foldable feeder comprising an inner section, an intermediate section and an outer section, the inner and intermediate sections being hinged together at their respective bottoms, and the outer and intermediate sections being hinged together above the plane of their respective bottoms, sprockets provided at the outer end of the outer section and the inner end of the inner section, endless chains with feeding elements passing around the sprockets, said outer section having side walls foldable toward each other upon the bottom thereof and over the chains, the intermediate section having rigid side walls, said sections when folded having the outer section with its folded side walls folded upon the intermediate section between the side walls of the latter, the folded side walls of the outer section acting to retain the sprocket chains during the process of folding the sections and also while said sections are in their folded relation, means for retaining the side sections in substantial horizontal alinement when extended, and means for retaining said sections in their folded relation.

12. In combination with a threshing machine, a foldable feeder comprising a plurality of hingedly connected sections, said sections being provided with sprockets, endless chains passed about the sprockets and provided with forks or engaging prongs, said sections being foldable one upon the other, the outer section having side walls which are hinged to the sides of the section so as to fold inwardly, the hinge connection being so disposed that when the side walls are folded, they extend over the forks or prongs, the height of the walls being such that when both walls are in their folded position, they cover substantially the entire width of said outer section, whereby the side walls serve to retain the chain during the process of folding the sections and while said sections are in their folded relation.

In testimony, that I claim the foregoing as my own, I have hereto affixed my signature in the presence of two witnesses.

CHARLIE F. STRNAD.

Witnesses:
F. J. KADAVY,
F. M. HANZLICK.

Copies of this patent may be obtained for five cents each, by addressing the "Commissioner of Patents, Washington, D. C."